United States Patent
Subbotin

(10) Patent No.: US 7,769,286 B2
(45) Date of Patent: Aug. 3, 2010

(54) METHOD AND APPARATUS OF DETERMINING THE BEST FOCUS POSITION OF A LENS

(75) Inventor: Igor Subbotin, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/326,598

(22) Filed: Dec. 2, 2008

(65) Prior Publication Data

US 2009/0116829 A1    May 7, 2009

Related U.S. Application Data

(63) Continuation of application No. 11/354,126, filed on Feb. 15, 2006, now Pat. No. 7,474,846.

(51) Int. Cl.
G03B 13/36 (2006.01)

(52) U.S. Cl. .................. 396/122; 348/353; 250/201.7

(58) Field of Classification Search ......... 396/121–125; 250/201.2, 201.4, 201.7, 201.8; 348/345, 348/353–356
See application file for complete search history.

(56) References Cited

U.S. PATENT DOCUMENTS

| | | | |
|---|---|---|---|
| 4,796,043 A | 1/1989 | Izumi et al. | |
| 4,878,079 A | 10/1989 | Hamada et al. | |
| 4,899,194 A | 2/1990 | Hori et al. | |
| 4,943,824 A * | 7/1990 | Nabeshima et al. | 396/50 |
| 5,003,165 A | 3/1991 | Sarfati et al. | |
| 5,040,228 A | 8/1991 | Bose et al. | |
| 5,913,082 A * | 6/1999 | Onoda | 396/128 |
| 6,140,630 A | 10/2000 | Rhodes | |
| 6,204,524 B1 | 3/2001 | Rhodes | |
| 6,310,366 B1 | 10/2001 | Rhodes et al. | |
| 6,326,652 B1 | 12/2001 | Rhodes | |
| 6,333,205 B1 | 12/2001 | Rhodes | |
| 6,376,868 B1 | 4/2002 | Rhodes | |
| 6,441,855 B1 * | 8/2002 | Omata et al. | 348/356 |
| 2003/0063211 A1 * | 4/2003 | Watanabe et al. | 348/345 |

OTHER PUBLICATIONS

The American Heritage® Dictionary of the English Language, 2007 edition, definitions of "weight" and "factor".*
Hargrave's Communications Dictionary, 2001 edition, definition of "histogram".*

* cited by examiner

Primary Examiner—Rochelle-Ann J Blackman
Assistant Examiner—Leon W Rhodes
(74) Attorney, Agent, or Firm—Dickstein Shapiro LLP

(57) ABSTRACT

A method and apparatus for accurately auto focusing a lens of an imaging device. An imaged scene is split into an array of zones. The minimum and maximum sharpness score for each zone is determined over a plurality of lens positions. A histogram of the lens positions of the corresponding maximum weighted sharpness score for each zone is created. The peak of the histogram is determined to be the best focus position for a given scene.

18 Claims, 5 Drawing Sheets

METHOD AND APPARATUS OF DETERMINING THE BEST FOCUS POSITION OF A LENS

This application is a continuation of U.S. application Ser. No. 11/354,126, filed Feb. 15, 2006, now U.S. Pat. No. 7,474,846 the entirety of which is incorporated herein by reference.

FIELD OF THE INVENTION

The invention relates generally to a image capturing device and more particularly to an automatic focusing technique for a image capturing device.

BACKGROUND OF THE INVENTION

Most cameras, including digital cameras, have an automatic focus feature in which scenes viewed through the camera can be focused automatically. Modem cameras implement auto focusing by measuring several areas of the scene and by determining where in the scene (or in which measured area) the scene's subject is located. Auto focus systems are generally categorized as either active or passive systems. Active systems actually determine the distance between the camera and the subject of the scene by measuring the total travel time of ultrasonic waves or infrared light emitted from the camera. Based on the total travel time, the distance between the camera and the subject of the scene may be calculated and the appropriate lens position may be selected. Passive auto focus systems, on the other hand, do not require the emission of ultrasonic waves or infrared light, but instead simply rely on the light that is naturally reflected by the subject in the scene.

One example of a passive auto focus system is an auto focus system that utilizes contrast measurement to determine the best focal position. In a contrast measurement auto focus system, adjacent areas of a scene are compared with each other. Specifically, the camera measures any differences in intensity among the adjacent areas of the scene. An out-of-focus scene will include adjacent areas that have similar intensities. A focused scene will likely show a significant contrast between areas in which the subject of the scene is located and other areas of the scene. As the camera incrementally moves the auto focus lens, each area of the scene is analyzed to determine any differences in intensity between adjacent areas. When a lens position is found that results in the maximum intensity difference between adjacent areas, the camera will use the found lens position for its auto focus setting.

One problem that arises when using the contrast measurement auto focus method, as described above, is how to handle a scene that has multiple subjects that are of varying distances from the camera. In such a situation, finding the best lens focal position is more challenging. For example, in a scene that includes two subjects, the contrast measurement auto focus method may correctly identify the presence of the two subjects as indicated by the existence of multiple regions of high intensity differences, but the contrast measurement auto focus method may be unable to resolve which of the two subjects should be selected for determination of a best lens focal position. Many conventional contrast measurement auto focus methods account for this situation by determining a sharpness score for each pair of adjacent scene areas, and then determining an average sharpness score for an entire frame or camera window. However, the conventional methods often fail to produce the best results for a scene with two or more objects that are different distances from the camera. Many times, the lens position resulting in the maximum average sharpness for the scene does not result in either of the two objects being in focus.

One solution to the problem described above is explained in U.S. patent application Ser. No. 11/176,284, filed on Jul. 8, 2005, hereby incorporated by reference in its entirety. The '284 application describes a method in which the imaged scene is divided into a two-dimensional array of zones. For each of a plurality of lens positions, the maximum sharpness score for each zone is determined. Then, a histogram is generated, showing each lens position with its corresponding combined maximum sharpness score for the zones. The lens position with the highest peak on the histogram is determined to be the best focus position for the given scene. Thus, instead of averaging over all possible lens positions, only the lens position associated with the highest overall sharpness score is used.

Although the method described in the '284 application is a clear improvement over the conventional methods, as described above, the method of the '284 application can be improved upon. Specifically, there is a need and a desire for a method of auto focusing a camera and its lens in low light or high noise conditions.

BRIEF SUMMARY OF THE INVENTION

The present invention provides a method and apparatus for accurately auto focusing a lens of an imaging device. In an exemplary embodiment, an imaged scene is split into an array of zones. The minimum and maximum sharpness score for each zone is determined over a plurality of lens positions. A histogram of the lens positions of the corresponding maximum weighted sharpness score for each zone is created. The peak of the histogram is determined to be the best focus position for a given scene.

DETAILED DESCRIPTION OF THE INVENTION

The present invention relates to a method and system for accurately and automatically focusing an imaging device having an image sensor, for example, a digital camera. The imaging device has a lens with a number L of programmable lens positions P[ip], where the position index ip ranges from 0 to L−1. The lens positions P[ip] are evenly spaced between P[0] and P[L−1]. The scene to be imaged by the image sensor is divided into K zones, organized in an M by N two-dimensional array, and indexed by zone index iz, where the zone index iz ranges from 0 to K−1.

As described in greater detail below, when a user is ready to take a picture using the imaging device of the invention, the imaging device microprocessor shifts the lens through all programmed lens positions P[ip] and determines a sharpness score S for each zone and each lens position P[ip]. A minimum and maximum sharpness score Smin[iz], Smax[iz] is determined for each zone. In addition, the lens position P[i_max] at which the maximum sharpness score Smax[iz] was found is determined for each zone. A maximum difference maxDeltaS is found between the maximum and the minimum sharpness scores Smax[iz], Smin[iz] for all zones. Then, a weight W[iz] for each zone is calculated by finding the difference between the maximum and minimum sharpness scores Smax[iz], Smin[iz] for each zone and normalizing the difference by the maximum difference maxDeltaS (i.e., W[iz]=(Smax[iz]−Smin[iz])/maxDeltaS). A histogram distribution of the lens positions P[ip] corresponding to maximum sharpness scores Smax[iz] from each zone is compiled. For each histogram value H[ip] representing a lens position P[ip], the zone weights W[iz] for each zone whose maximum sharpness score Smax[iz] corresponds to the lens position P[ip] associated with the histogram value H[ip] are summed. The histogram value H[ip] having the maximum peak represents the lens position with the best focus position P[iBFP] for a given scene.

Figure 1A:
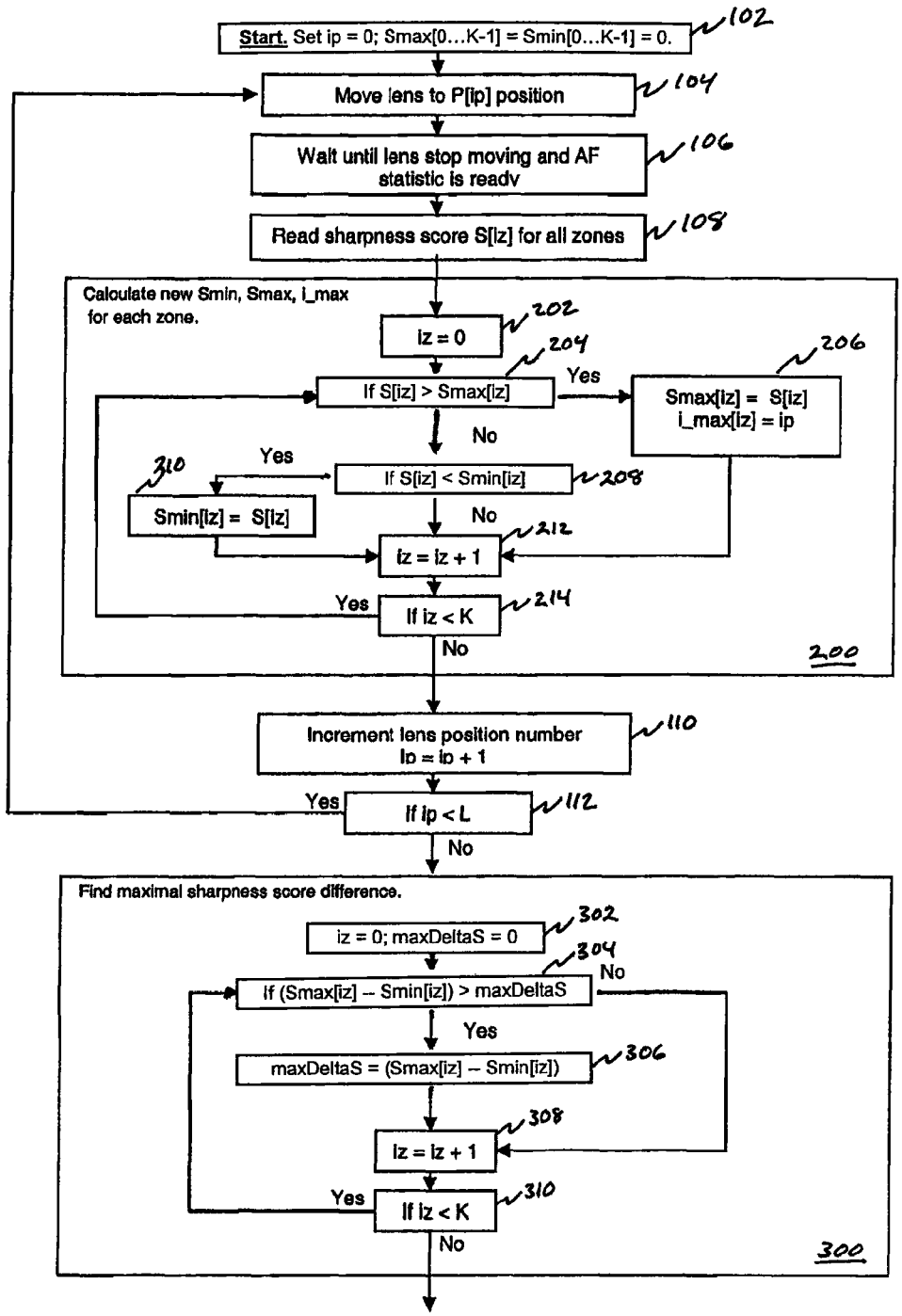
FIGS. 1A and 1B illustrate a flowchart depicting a method of determining the best focal position of a lens for a given image, according to an exemplary embodiment of the invention.
Figure 1B:
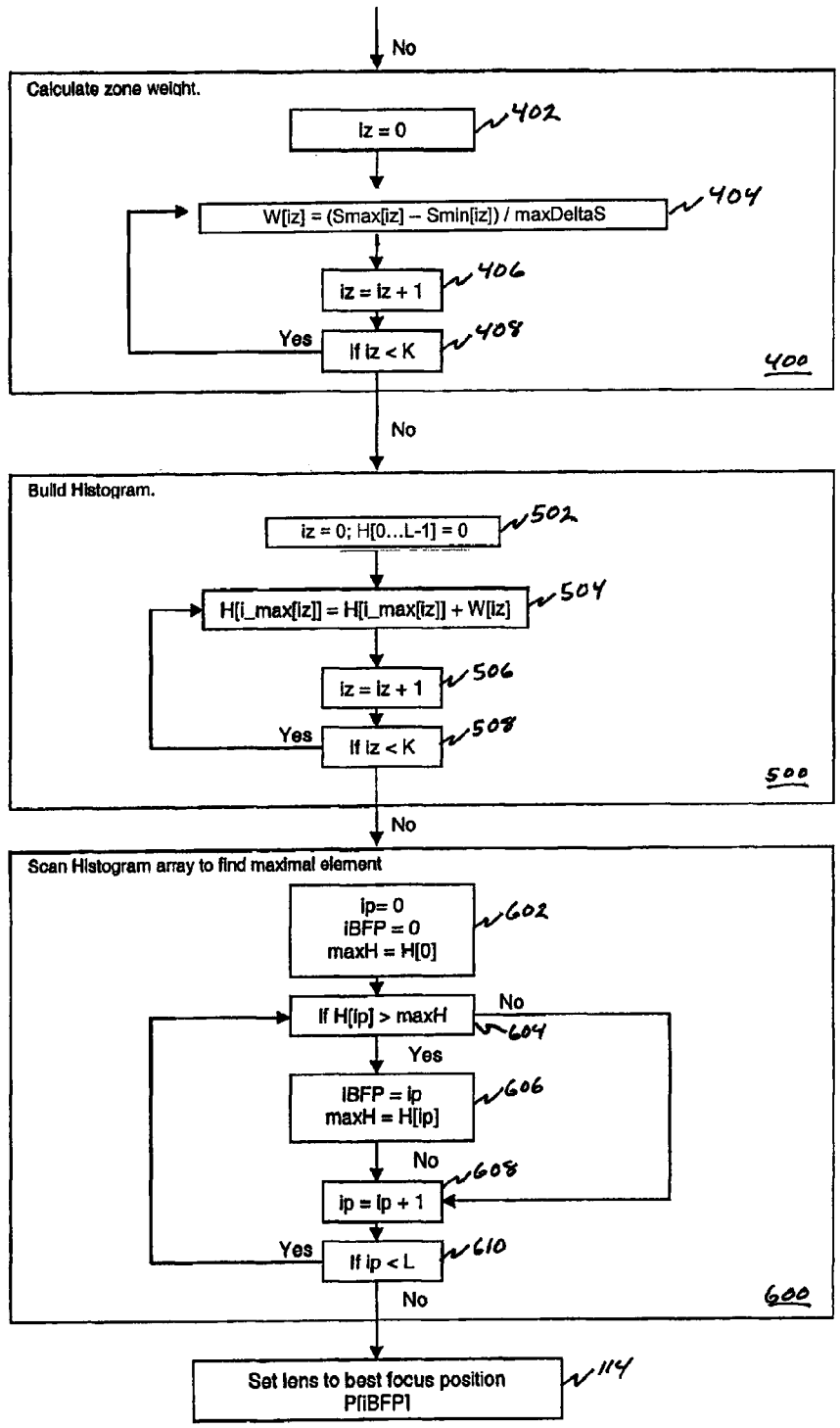

FIGS. 1A and 1B illustrate in greater detail a method 100 generally described above as preformed by a processor of an imaging device, according to an embodiment of the invention. Method 100 may be subdivided into five major submethods. Submethod 200 is used to determine the maximum and minimum sharpness scores Smax, Smin, for each zone, as well as the lens position P[i_max] that corresponds to the maximum sharpness score for each zone. Submethod 300 is used for finding the maximum difference maxDeltaS between the maximum and minimum sharpness scores Smax[iz], Smin[iz] for each zone. Submethod 400 is used to calculate the zone weight W[iz] for each zone. Submethod 500 is used to build a histogram based on the calculated zone weights W[iz]. Submethod 600 is used to determine from the histogram which lens position P[iBFP] provides the optimal focus for the scene.

In method 100, when a user desires to capture an image by, for example, partially or completely pressing a shutter button, initialization step 102 occurs first, wherein the lens position index ip and the maximum and minimum sharpness scores for each zone Smax[iz], Smin[iz] are initialized to zero. Next, the lens is moved to lens position P[ip] (block 104). Once the lens has stopped moving and all other data collection modules are ready (block 106), a sharpness score S[iz] is determined for all zones in the scene (block 108). As explained above, the sharpness score is a number representing the degree of contrast between adjacent areas within a zone. The higher the number or sharpness score, the greater the contrast, and the greater the probability that the zone is in focus.

In a digital camera, sharpness scores are determined by measuring the difference between the intensities of adjacent areas of an image sensor pixel array. The pixel array is divided into multiple zones, and a sharpness score for each zone is calculated after an analysis of adjacent areas within each zone. In a red/green/blue (RGB) pixel array, the intensity of each pixel may be calculated by converting the RGB values into a hue/saturation/value (HSV) system, where the value V variable is used to represent intensity. In this way, intensity values for each pixel may be calculated, and differences in intensities of multiple pixels may be calculated. These differences in intensities represent sharpness scores. At least one sharpness score is calculated for each zone. In the case where multiple sharpness scores are generated for each zone, an average sharpness score may be used to represent the zone.

Once all sharpness scores S[iz] have been determined for the lens position P[ip], submethod 200 is used to calculate updated maximum and minimum sharpness scores Smax[iz], Smin[iz] for each zone. Submethod 200 is also used to calculate the lens position P[i_max] for each calculated maximum sharpness score Smax[iz]. To accomplish this, zone index iz is initialized to zero (block 202). Then, for each zone, a newly calculated sharpness score S[iz] is compared with the maximum sharpness score Smax[iz] for the zone (block 204). If S[iz] is greater than Smax[iz], meaning that the zone represented by zone index iz is in greater focus than previously determined with other lens positions, then the maximum sharpness score Smax[iz] for the zone is set to the newly calculated sharpness score S[iz], and the best lens position index i_max[iz] corresponding to the maximum sharpness score Smax[iz] is set to the lens position index ip (block 206). If, on the other hand, the newly calculated sharpness score S[iz] does not exceed the current maximum sharpness score Smax[iz], then the newly calculated sharpness score S[iz] is tested to determine if it is less than the current minimum sharpness score Smin[iz] (block 208). If the newly calculated sharpness score S[iz] is less than the current minimum sharpness score Smin[iz], then the minimum sharpness score Smin[iz] is set to the newly calculated sharpness score S[iz] (block 210). Once the maximum and minimum sharpness scores Smax[iz], Smin[iz] have been modified, if necessary, the zone index iz is incremented by one (block 212), and if the incremented zone index iz is less than the number K of zones (block 214), the next zone is analyzed (blocks 204-214 are repeated). Once all zones are analyzed and each zone's respective minimum and maximum sharpness scores Smin[iz], Smax[iz] and best lens position index i_max[iz] have been updated, if necessary, the lens position index ip is incremented by one (block 110), and, assuming the current lens position index ip is less than the total number L of lens positions (block 112), the entire submethod 200 is repeated, including blocks 104, 106, 108 and 110. This process continues until each zone has been analyzed for each lens position.

Once updated minimum and maximum sharpness scores Smin[iz], Smax[iz] are calculated for each zone, according to the procedure of submethod 200, a maximum sharpness score difference maxDeltaS may be calculated using submethod 300. Initially, the zone index iz and the maximum sharpness score difference maxDeltaS are set to zero (block 302). Then, for each zone (see blocks 308, 310), the difference between the maximum and minimum sharpness scores Smax[iz], Smin[iz] is calculated (block 304). If the calculated difference is greater than the current maximum sharpness score difference maxDeltaS, then the maximum sharpness score difference maxDeltaS is set to the calculated difference (block 306). In this way, once each zone has been evaluated, the maximum sharpness score difference maxDeltaS will contain a value equal to the maximum difference in sharpness scores for all zones.

The calculated maximum sharpness score difference maxDeltaS is used to calculate a zone weight W[iz] for each zone in submethod 400. To calculate the zone weight W[iz] for each zone, the zone index iz is initialized to zero (block 402), and then for each zone (see blocks 406, 408), a normalized sharpness score difference is calculated to indicate the zone weight W[iz]. In other words, for any given zone, W[iz] is made equal to the difference between the maximum and minimum sharpness scores Smax[iz], Smin[iz] for the zone divided by the maximum sharpness score difference maxDeltaS (block 404). Thus, all zone weights W[iz] will have values ranging between zero and one.

A histogram is built in submethod 500 using the calculated results from submethods 200 and 400. The histogram will indicate, on one axis, histogram values H[ip] corresponding to each of the possible lens positions P[ip]. The other axis of the histogram will indicate the total zone weight for each lens position P[i_max[iz]] corresponding to a maximum sharpness score Smax[iz] for each zone. To build the histogram, the zone index iz and individual histogram values H[ip]] are initialized to zero (block 502). The zone weight W[iz] for each zone (see blocks 506, 508) is added to the histogram value H[ip] corresponding to the lens position P[i_max[iz]] that corresponds with the maximum sharpness score Smax [iz] for each zone (block 504). Thus, the histogram effectively shows the total weighted sharpness scores for each lens position P[ip].

The lens position P[ip] corresponding to the highest total weighted sharpness score, as shown by the histogram, represents the best focal position P[iBFP] for the lens for the given scene. The highest total weighted sharpness score is determined using submethod 600. Initially, the lens position index ip and a best focal position index iBFP are set to zero (block 602). A variable representing the maximum histogram value maxH is also initialized to equal histogram value H[0] (block 602). For each lens position P[ip] (see blocks 608, 610), the histogram value H[ip] is compared with the current maximum histogram value maxH (block 604). If a histogram value H[ip] is found to exceed the current maximum histogram value maxH, the best focal position index iBFP is set to the current lens position index ip, and the maximum histogram value maxH is set to the current histogram value H[ip] (block 606). Once all lens positions have been evaluated, the lens is set to the lens position defined by the best focal position index P[iBFP] (block 114).

An advantage of using method 100 is that method 100 determines a zone weight for each zone, where the zone weights are specific to each scene. Some conventional methods require that zone weights be predetermined. Generally, certain zones near the center of the scene are presumed to include the main subject, and, in conventional methods, the zone weights for these zones are predetermined. However, method 100 allows the zone weights to be automatically determined for each scene. Thus, even if a subject is not near the center of the scene, the zones of method 100 are weighted accurately.

Ultimately, the importance of "on-the-fly" zone weighting is reflected in accurate automatic focusing for scenes involving multiple subjects, high noise levels or low contrast. In scenes with multiple subjects, method 100 will determine a high zone weight to be assigned to each zone in which a subject is found. The lens position that resulted in the generation of the most and highest zone weights will be selected as the best lens focus position. This means that at least one of the multiple subjects will always be in focus. Even in scenes that include high noise or low contrast (such as a scene imaged in low-light conditions), method 100 will still accurately determine those zones displaying the greatest amount of contrast, which will nearly always reflect the location of a subject in the scene, thus enabling the determination of the best lens focus position.

It is to be understood that the invention is not limited to the implementation described above. Other embodiments of the invention may be conceived wherein the auto focusing of a lens structure is achieved by moving either a relative portion of the lens structure or the image sensor. For example, the lens may be moved relative to the image sensor, or the image sensor may be moved relative to the lens or both lens and the image sensor may be moved in the auto focusing method and apparatus described herein. Further the lens structure may include a plurality of lenses wherein at least one lens of the structure is movable.

Figure 2A:
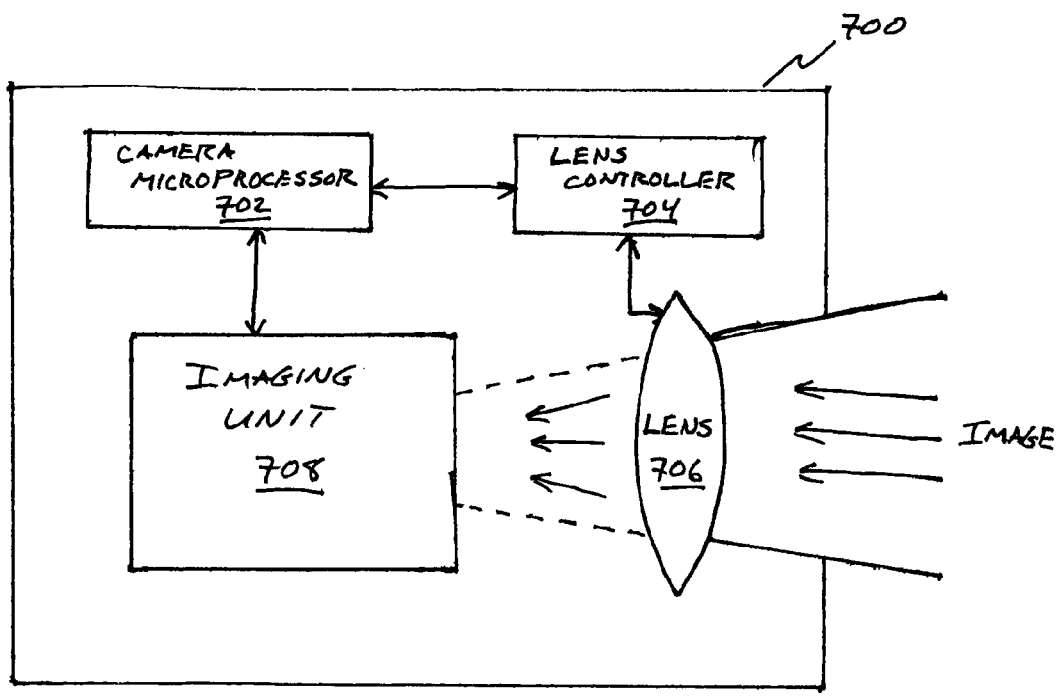
FIGS. 2A and 2B are block diagrams of a digital camera configured to implement a method for determining the best focal position of a lens for a given image, according to an exemplary embodiment of the invention.
Figure 2B:
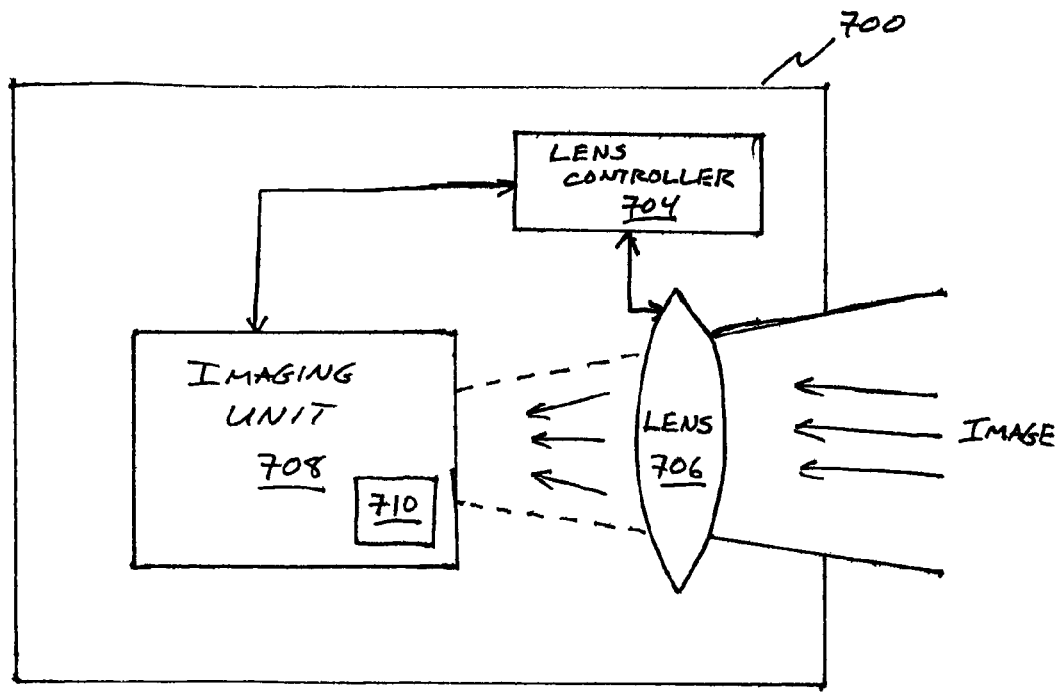

One embodiment of the invention is shown in FIGS. 2A and 2B, which illustrate exemplary internal circuitry of a digital camera 700 constructed in accordance with exemplary embodiments of the invention. FIG. 2A illustrates a digital camera 700 that receives an image through lens 706, where the image is captured by an imaging device 708. The digital camera 700 also includes a camera microprocessor 702 and a lens controller 704. The lens controller 704 moves the lens 706 in response to communications from the microprocessor 702. The camera microprocessor 702 operates according to method 100 of FIGS. 1A and 1B to vary the focal positions of lens 706 in an effort to find the best focal position iBFP for the scene. Alternatively, FIG. 2B illustrates an embodiment in which the imaging device 708, which includes a microprocessor 710, communicates directly with the lens controller 704 to control the movement of the lens 706 for determining the best focal position P[iBFP] for the scene.

Figure 3:
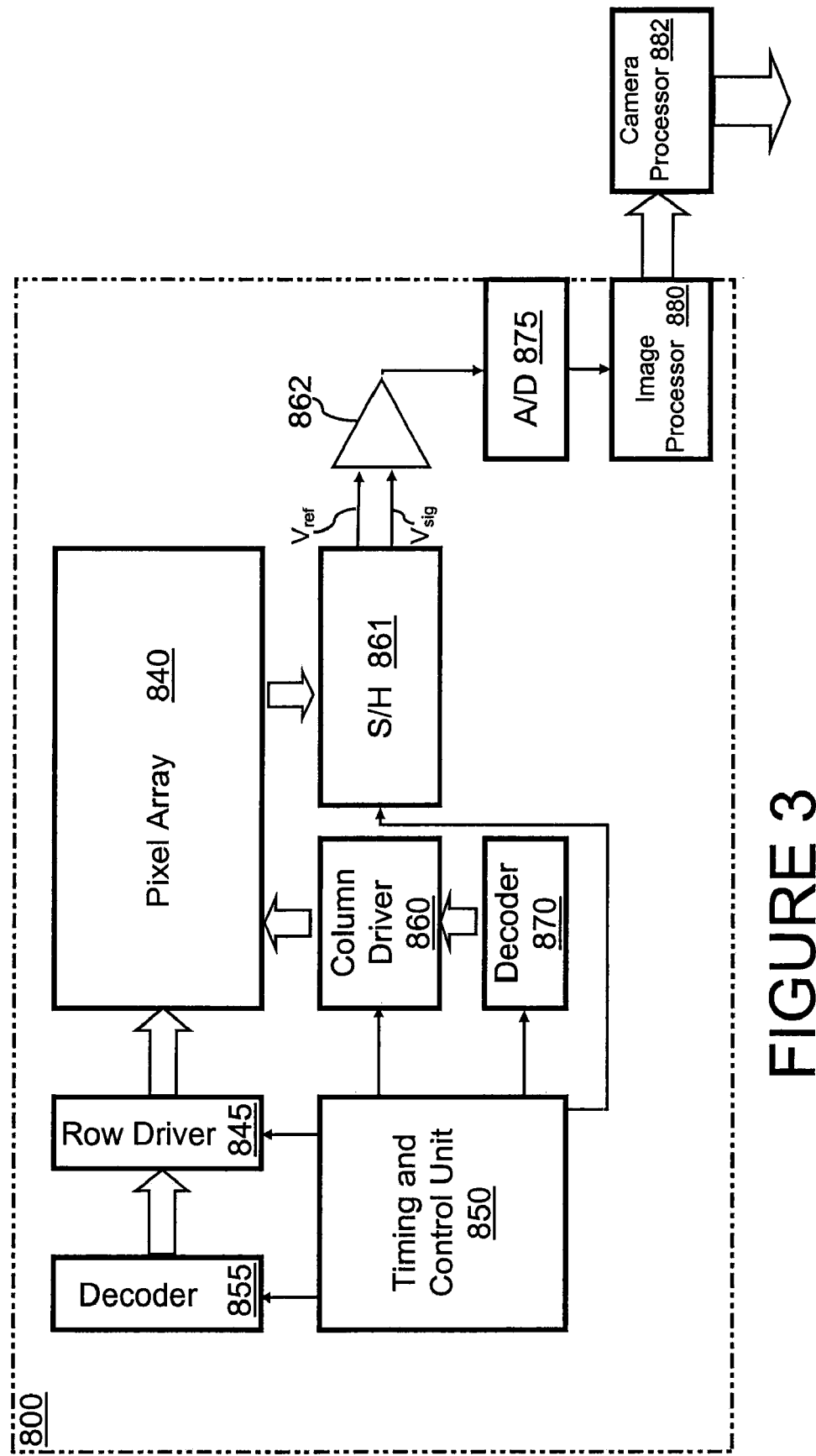
FIG. 3 is a solid-state complementary metal oxide semiconductor imager, according to an exemplary embodiment of the invention.

FIG. 3 shows an exemplary solid state complementary metal oxide semiconductor (CMOS) imager 800, for carrying out the embodiments described above. As shown, the exemplary CMOS imager 800 has a pixel array 840 comprising a plurality of pixels arranged in a predetermined number of columns and rows. Attached to the array 840 is signal processing circuitry. The pixels of each row in array 840 are all turned on at the same time by a row select line, and the pixels of each activated row are selectively output by respective column select lines. A plurality of row and column select lines are provided for the entire array 840. The row lines are selectively activated by a row driver 845 in response to row address decoder 855. The column select lines are selectively activated by a column driver 860 in response to column address decoder 870. Thus, a row and column address is provided for each pixel. A timing and control circuit 850 controls address decoders 855, 870 for selecting the appropriate row and column lines for pixel readout. The control circuit 850 also controls the row and column driver circuitry 845, 860 such that driving voltages may be applied. Each pixel generally outputs both a pixel reset signal $V_{ref}$ and a pixel image signal $V_{sig}$, which are read by a sample and hold circuit 861. $V_{ref}$ represents a reset state of a pixel cell. $V_{sig}$ represents the amount of charge generated by the photosensor in a pixel cell in response to applied light during an integration period. The difference between $V_{sig}$ and $V_{ref}$ represents the actual pixel cell output with common-mode noise eliminated. The differential signal ($V_{ref}-V_{sig}$) is produced by differential amplifier 862 for each readout pixel cell. The differential signals are then digitized by an analog-to-digital converter 875. The analog-to-digital converter 875 supplies the digitized pixel signals to an image processor 880, which forms and outputs a digital image. Either the image processor 880 or an external camera processor 882 may run the method described above with reference to FIGS. 1A and 1B. Although the invention has been described in connection with a SMOS imager array and processing system (FIG. 3), the invention is not so limited and may be incorporated into any image capture system, including film based imaging systems.

Figure 4:
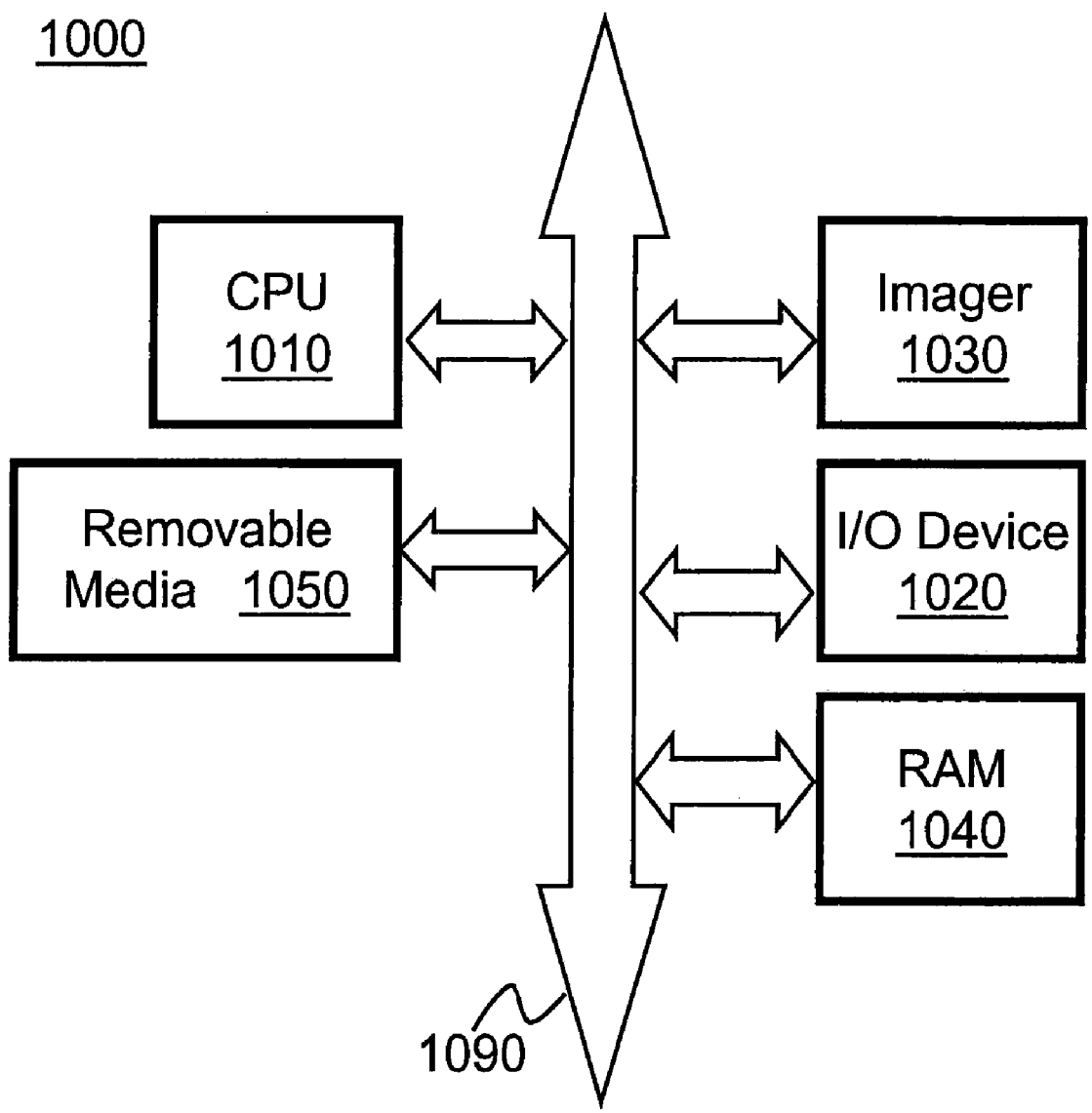
FIG. 4 is a block diagram of an imaging system, according to an exemplary embodiment of the invention.

FIG. 4 illustrates a typical processor system 1000, which may be used, for example, with the imaging system 800 illustrated in FIG. 3. System 1000, for implementing the above-described embodiments, generally comprises a central processing unit (CPU) 1010, such as a microprocessor 880 (see FIG. 3), that communicates with an input/output (I/O) device 1020 over a bus 1090. Imaging device 1030 also communicates with the CPU 1010 over the bus 1090. The processor-based system 1000 also includes random access memory (RAM) 1040, and can include removable media 1050, such as flash memory, which also communicate with the CPU 1010 over the bus 1090. The imaging device 1030 may be combined with a processor, such as a CPU, digital signal processor, or microprocessor, with or without memory storage on a single integrated circuit or on a different chip than the processor.

It is to be understood that the invention is not limited to the implementations described above. For example, some of the embodiments described above employ variables which are incremented up. However, it is contemplated that the variables may also be implemented by counting down to a preset number. Also, although the invention has been described in an embodiment including a complementary metal oxide (CMOS) semiconductor imager, one skilled in the art will recognize that the invention may also be applied in an embodiment that includes other imaging technologies, including but not limited to charge coupled device (CCD) imagers.

One skilled in the art will also recognize that the invention may also be implemented as a program stored on a computer readable carrier medium. A computer readable carrier medium includes any type of data storage or data transmission mediums. In this embodiment, the program causes a processor to execute a series of commands implementing the method 100 of FIGS. 1A and 1B.

The processes and devices described above illustrate exemplary methods and devices of many that could be used to implement the invention. The above description and drawings illustrate exemplary embodiments of the present invention. However, it is not intended that the present invention be strictly limited to the above-described and illustrated embodiments and is only limited by the scope of the appended claims.

What is claimed as new and desired to be protected by Letters Patent of the United States is:

1. A method of determining a focus position of a lens structure relative to an imaging sensor, the method comprising:
    reading at least two sharpness values for each of a plurality of zones of pixels, each sharpness value corresponding to one of a plurality of predetermined lens positions;
    using the sharpness values to determine a single zone weight for each zone; and
    using the zone weights to determine a focus position for the lens.

2. The method of claim 1, wherein the zone weights are image-specific.

3. The method of claim 2, wherein the sharpness values include a maximum sharpness value for each corresponding zone.

4. The method of claim 3, further comprising building an array of the lens positions for the corresponding maximum sharpness values.

5. The method of claim 4, wherein the array further comprises a summation of the zone weights for each zone whose maximum sharpness value corresponds to the lens position in the array.

6. The method of claim 5, wherein the zone weight for each zone is determined by calculating a difference between the maximum sharpness value and a minimum sharpness value for each zone and then normalizing the result of that calculation by a greatest determined difference between the maximum sharpness value and the minimum sharpness value for all zones.

7. The method of claim 6, wherein the determined focus position of the lens is based on the lens position value in the array with the largest sum of zone weights.

8. A method of determining a focus position of a lens structure relative to an imaging sensor, the method comprising:
    assigning each of a plurality of zones of an imaged scene a lens position based on one of at least two sharpness values for each zone;
    determining from the sharpness values for each zone a zone weight for each zone; and
    setting the focus position of the lens by summing the zone weights for each corresponding assigned lens position and using the lens position with the largest sum.

9. The method of claim 8, wherein the assigned lens positions for each zone are lens positions that correspond to a maximum sharpness value for the respective zone.

10. The method of claim 9, wherein the zone weight for each zone is determined by calculating a difference between the maximum sharpness value and a minimum sharpness value for each zone and then normalizing the result of that calculation by a greatest determined difference between the maximum sharpness value and the minimum sharpness value for all zones.

11. The method of claim 8, wherein the zone weight for each zone is specific to a scene imaged by the imaging sensor.

12. An imaging device comprising:
    a sensor for sensing an image through a lens structure; and
    a controller system for receiving an image from the sensor and determining a focus position for the image, the controller system operating to:
        determine a focus position for each of a plurality of zones of the image, the focus position for each zone corresponding to one of at least two sharpness scores for each zone;
        determine from the sharpness scores for each zone the weight to be accorded each zone; and
        identify an image focus position from the determined zone focus positions corresponding to a maximum summed value of zone weights.

13. The device of claim 12, wherein the zone weights are determined by finding a difference between a maximum sharpness score and a minimum sharpness score for each zone.

14. The device of claim 13, wherein the zone focus positions correspond to the maximum sharpness score for each corresponding zone.

15. The device of claim 12, wherein the controller system operates to generate an array of the zone focus positions.

16. The device of claim 15, wherein the array further comprises a summation of the zone weights for each zone whose zone focus position corresponds to the focus position in the array.

17. The device of claim 16, wherein the zone weight for each zone is determined by calculating a difference between a maximum sharpness value and a minimum sharpness value for each zone and then normalizing the result of that calculation by a greatest determined difference between the maximum sharpness value and the minimum sharpness value for all zones.

18. The device of claim 17, wherein the image focus position is based on a peak array value.

* * * * *